US012159729B2

(12) United States Patent
Tilton

(10) Patent No.: US 12,159,729 B2
(45) Date of Patent: Dec. 3, 2024

(54) SYSTEM FOR STORING A RADIOACTIVE SALT SOLUTION

(71) Applicant: X-Energy, LLC, Rockville, MD (US)

(72) Inventor: Alex Tilton, Knoxville, TN (US)

(73) Assignee: X-Energy, LLC, Rockville, MD (US)

( * ) Notice: Subject to any disclaimer, the term of this patent is extended or adjusted under 35 U.S.C. 154(b) by 311 days.

(21) Appl. No.: 17/821,692

(22) Filed: Aug. 23, 2022

(65) Prior Publication Data

US 2024/0071639 A1 Feb. 29, 2024

(51) Int. Cl.
*G21F 5/002* (2006.01)
*G21F 5/12* (2006.01)

(52) U.S. Cl.
CPC ................ *G21F 5/002* (2013.01); *G21F 5/12* (2013.01)

(58) Field of Classification Search
CPC .................................. G21F 5/002; G21F 5/12
See application file for complete search history.

(56) References Cited

U.S. PATENT DOCUMENTS 3,097,768 A 7/1963 Tasca
3,749,917 A 7/1973 Kucherer
4,056,362 A 11/1977 Gablin
4,440,673 A * 4/1984 Ambros .................... G21F 9/08 588/20
4,636,363 A * 1/1987 Kratz ...................... G21F 9/304 141/285
5,314,215 A 5/1994 Weinhold
(Continued)

FOREIGN PATENT DOCUMENTS

CN 211663920 10/2020
DE 102009036722 A1 3/2010
(Continued)

OTHER PUBLICATIONS

International Search and Written Opinion for PCT/US2023/072471 mailed on Jan. 22, 2024.
(Continued)

*Primary Examiner* — Eric Keasel
(74) *Attorney, Agent, or Firm* — Kramer & Amado, P.C.

(57) ABSTRACT

An improved system for receiving and storing a radioactive salt solution includes a tank configured to receive the radioactive salt solution while preventing criticality accidents, a solution inlet for carrying the radioactive salt solution to the tank, an overflow bottle, and a cap sealing the top end of the tank. The cap includes a lateral wye fitting having a lateral pipe configured to direct the radioactive salt solution from the solution inlet into the tank, a vertical pipe configured to direct gases from the tank to a ventilation system, and an overflow line configured to carry excess radioactive salt solution from the tank to the overflow tank. An air gap between the lateral pipe and the solution inlet prevents backflow of the radioactive salt solution into the solution inlet. A control system includes a level switch configured to provide a signal that the tank contains a maximum volume of the radioactive salt solution, a first valve configured to terminate flow of the radioactive salt solution to the lateral pipe upon receipt of the signal from the level switch; and a second valve configured to allow flow of the radioactive salt solution from the tank to the overflow line.

9 Claims, 6 Drawing Sheets

(56) References Cited

U.S. PATENT DOCUMENTS

| | | | | |
|---|---|---|---|---|
| 5,378,410 | A | 1/1995 | Erbse | |
| 6,041,618 | A | 3/2000 | Patel | |
| 6,276,311 | B1 | 8/2001 | Reineking | |
| 6,467,811 | B2 | 10/2002 | Mitchell | |
| 6,671,344 | B2 * | 12/2003 | Matsunaga | G21F 5/12 250/507.1 |
| 8,479,767 | B2 | 7/2013 | Newman | |
| 10,134,496 | B2 | 11/2018 | Osborn | |
| 2020/0271254 | A1 | 8/2020 | Martin | |

FOREIGN PATENT DOCUMENTS

| | | | |
|---|---|---|---|
| DE | 102017204710 | A1 | 9/2018 |
| EP | 0102121 | A1 | 3/1984 |
| EP | 0315723 | A1 | 5/1989 |
| KR | 200145591 | Y1 | 6/1999 |

OTHER PUBLICATIONS

Haas et al., "Chemical Flowsheet Conditions for Preparing Urania Spheres by Internal Gelation", 34th Northwest Regional Meeting of the American Chemical Society, Richland, Washington, Jun. 13-15, 1979.

https://www.alibaba.com/product-detail/10001-1001-500l-stainless-steel-horizontal_1600114876286.html?spm=a2700.galleryofferlist.normal_offer.d_titl.

https://www.gitank.com/nitric-acid-storage-tanks.

https://www.rvautoparts.com/85505-Moroso-Performance-Radiator-Overflow-Tank-9-Inch-Height-3-Inch_p_363328.html.

https://www.glaciertanks.com/tri-clamp-fittings-filters-air-vent-150.html?gclid=CjOKCQjw9_mDBhCGARIsAN3PaFNIFLujX5GOwRaZCf6xJkvIL7XurvGC . . . .

https://www.ppepower.com/shop/coolant-overflow-tank-gm-6-61-duramax-2007-5-201 O-diesel-gas-116454075.html.

Eagle Stainless Stainless steel sanitary bottle; 1 liter, 3" flange; Eagle Stainless—Mfr# BTB-10—Item# UX-07506-31.

https://www.jiayuanfitting.com/sae-flange-couplings/square-flanges.html.

https://www.piyush-steel.com/ansi-asme-16.5-square-flanges.html.

https://www.rexinostainless.com/steel-flange-flanges-manufacturer-india/asme-16-5-square-flanges-manufacturer-suppliers.html.

Kumar Pipe Hangers & Pipe Support Systems; K-314 Flange Support.

* cited by examiner

SYSTEM FOR STORING A RADIOACTIVE SALT SOLUTION

TECHNICAL FIELD

Various exemplary embodiments disclosed herein relate generally to systems for storing toxic radioactive salt solutions.

BACKGROUND

Acid deficient uranyl nitrate solutions are used in a sol-gel process for fuel fabrication. However, such solutions are toxic, and a system for safely storing unused or waste uranyl nitrate solutions, as well as other radioactive salt solutions, is required. Additionally, acid deficient uranyl nitrate solutions have a uranium concentration of from 0.5 M to 3.5 M, and a pH of 0.5 to 2.8. The system for storing uranyl nitrate solutions must therefore be able to withstand exposure to highly acidic conditions.

Other radioactive salt solutions may be used in a sol-gel process for fuel fabrication, including various nitrate salts of radioactive metals. Ceramic fuel elements based on uranium, thorium, and plutonium are made from acidic solutions of $UO_2(NO_3)_2$ (uranyl nitrate), $U(NO_3)_6$ (uranium nitrate), $K_2UO_2(SO_4)_2$ (potassium uranyl sulfate), $UO_2(SO_4)$ (uranyl sulfate), $U(SO_4)_2$ (uranium sulfate), uranium phosphates, $Th(NO_3)_4$, or $Pu(NO_3)_4$. Thus, a system for safely storing unused or waste radioactive salt solution should be suitable for storing various radioactive metal salts.

In view of the foregoing, it would be desirable to develop improved methods and systems for storing toxic radioactive salt solutions.

SUMMARY

In light of the present need for storing toxic, radioactive, or otherwise dangerous liquid materials, a brief summary of various embodiments is presented. Some simplifications and omissions may be made in the following summary, which is intended to highlight and introduce some aspects of the embodiments disclosed herein, but not to limit the scope of the invention. Detailed descriptions of embodiments adequate to allow those of ordinary skill in the art to make and use the inventive concepts will follow in later sections.

Various embodiments disclosed herein relate to a system for receiving and storing a radioactive salt solution, including:

- a tank having a top and a bottom, the tank being configured to receive the radioactive salt solution while preventing criticality accidents, wherein the tank has a defined width;
- a solution inlet for carrying the radioactive salt solution to the tank;
- an overflow bottle;
- a cap sealing the top end of the tank; and
- an air gap between the lateral pipe and the solution inlet configured to prevent backflow of the radioactive salt solution into the solution inlet.

In various embodiments, the cap includes a lateral wye fitting having:

- a lateral pipe configured to direct the radioactive salt solution from the solution inlet into the tank,
- a vertical pipe configured to direct gases from the tank to a ventilation system; and
- an overflow line configured to carry excess radioactive salt solution from the tank to the overflow tank.

The system for receiving and storing a radioactive salt solution may also include a pickup for the ventilation system configured to receive the gases from the tank, and a second air gap between the pickup and the vertical pipe configured to prevent flow of the radioactive salt solution into the pickup.

In various embodiments, the system includes a control system having:

- a level switch configured to provide a signal that the tank is full, i.e., that the tank contains a maximum volume of the radioactive salt solution;
- a first valve configured to terminate flow of the radioactive salt solution from the solution inlet to the lateral pipe upon receipt of the signal from the level switch; and
- a second valve configured to:
  - allow flow of the radioactive salt solution from the tank to the overflow line, and
  - allow flow of the gases from the tank to the pickup.

The first valve is set to a Normally Closed condition to prevent overfilling of the tank in the event of failure; and the second valve is set to a Normally Open condition to prevent spilling of the radioactive salt solution in the event of failure when the tank is being filled. The second valve is configured to be closed when the tank is not being filled or emptied, thereby preventing liquids or gases in the tank from escaping. In various embodiments, the first valve and the second valve are solenoid valves.

The system for receiving and storing a radioactive salt solution may also include a solution outlet at the bottom of the tank, and a valve configured to allow the radioactive salt solution in the tank to flow through the solution outlet, thereby emptying the tank.

The system for receiving and storing a radioactive salt solution may include an input pump configured to pump the radioactive salt solution to the solution inlet, wherein the input pump stops pumping the radioactive salt solution upon receipt of a signal from the level switch, thereby preventing overfilling of the tank.

In various embodiments, the overflow bottle in the system for receiving and storing a radioactive salt solution includes a container having a mouth; and a cap including a breather vent configured to trap harmful vapors, an opening welded to the overflow line; and a means for removably securing the cap to the mouth of the container. The means for removably securing the cap to the mouth of the container may include:

- a tri-clamp closure,
- a clamp with C-shape clamping sections connected by a hinge, the clamp being configured to engage an outer circumference of the cap and an outer circumference of the mouth; or
- a male thread on the mouth of the container configured to mate with a corresponding female thread on the cap.

BRIEF DESCRIPTION OF THE DRAWINGS

In order to better understand various exemplary embodiments, reference is made to the accompanying drawings, wherein.

DETAILED DESCRIPTION

Figure 1:
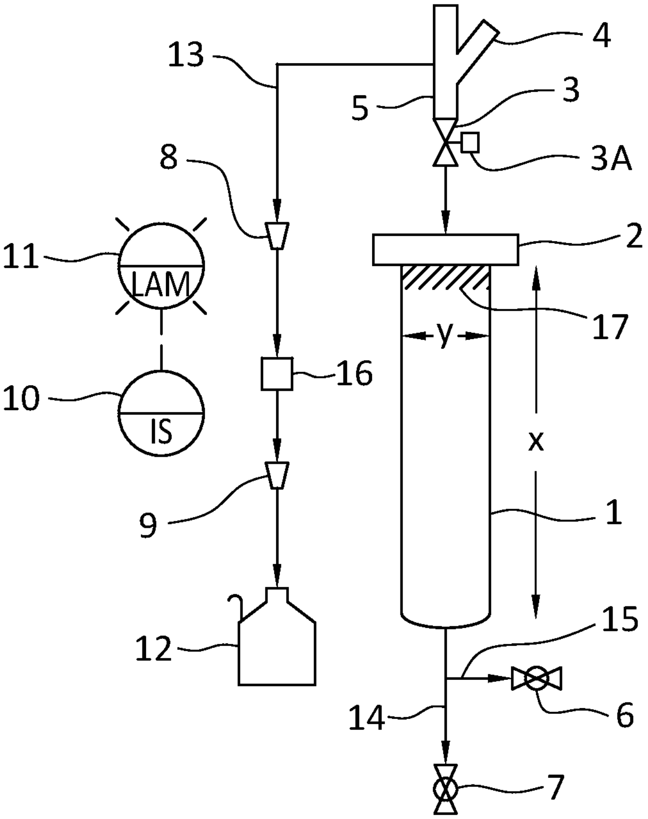
FIG. 1 illustrates a system for receiving and storing a radioactive salt solution.

Scrap or waste acid-deficient uranyl nitrate (ADUN) solutions need to be stored safely. Safe ADUN storage requires a tank which is geometrically safe to prevent possibility of a criticality accident, i.e., a tank having an outer diameter of about 5 inches or less, 4.5 inches or less, or 4 inches or less. The tank must be chemically resistant to concentrated nitric acid.

While ADUN solution storage is of particular interest herein, other radioactive salt solutions which may be used as precursors for formation radioactive ceramic nuclear fuels by sol-gel processes may be stored with the systems disclosed herein. Suitable radioactive salt solutions include acidic solutions of $UO_2(NO_3)_2$ (uranyl nitrate), $Th(NO_3)_4$, $Pu(NO_3)_4$, and mixtures thereof. Radioactive salt solutions based on uranium, thorium, and plutonium may be acidic solutions of $UO_2(NO_3)_2$ (uranyl nitrate), $U(NO_3)_6$ (uranium nitrate), $K_2UO_2(SO_4)_2$ (potassium uranyl sulfate), $UO_2(SO_4)$ (uranyl sulfate), $U(SO_4)_2$ (uranium sulfate), uranium phosphates, $Th(NO_3)_4$, or $Pu(NO_3)_4$.

A solution of acid deficient uranyl nitrate, may be prepared by dissolving a uranium oxide in aqueous nitric acid to produce a uranium solution, placing the uranium solution under a pressure of 5 to 40 atmospheres in a sealed reaction chamber, and heating the uranium solution to a desired holding temperature of between 150° C. and 250° C. The uranium solution is maintained at the desired holding temperature in the sealed vessel for a desired hold time, and then the pressure and temperature of the uranium solution are reduced to obtain an acid deficient uranyl nitrate solution.

Once the acid deficient uranyl nitrate solution is prepared, it is converted into a ceramic nuclear fuel particle by sol-gel processes known in the art. Such conversion may be carried out immediately, or acid deficient uranyl nitrate solution may be stored for later use in an acid-resistant tank.

Storage of scrap acid-deficient uranyl nitrate (ADUN) requires a tank which is geometrically safe, to prevent possibility of a criticality accident. Generally, the tank may have any desired height, but must have a narrow width to avoid excessive buildup of nuclear material at any point along the height of the tank. Since acid-deficient uranyl nitrate is formed in a nitric acid solution, the tank must be chemically resistant to concentrated nitric acid. The tank must be designed to preclude the possibility of solution backflow into a solution inlet, which may be done through the inclusion of air gaps. The tank should be capable of sealing to simultaneously limit both gas emissions and overflow of ADUN solution from the tank.

The tank should include a pickup for ventilation to remove off gases from the tank during filling and emptying operations, where ventilation from the tank cannot blocked unless all flow into or out of the tank is ceased. Additional features of the system include:

- an overflow line able to carry excess fluid away from the tank;
- a level switch to shutoff flow of ADUN solution into the tank before the tank is full; and
- an optional demister internal to the tank to limit emission of solution droplets to the ventilation pickup.

The system for receiving and storing a radioactive salt solution disclosed herein contains the following improved design features:

- a backflow-safe inlet flange (BSIF) which prevents solution backflow, provides independent overflow path, interfaces with facility ventilation, and allows for sealing the tank to prevent vapor release;
- a criticality-safe tank support (CTS) which allows for mounting the tank to a process skid; and
- a criticality-safe tank overflow bottle (CTOB) which provides a final containment avenue for solution during an overflow event.

FIG. 1 illustrates a system for receiving and storing a radioactive salt solution, such as ADUN. The system includes a tank 1 having an outer diameter y and a height x. In various embodiments, the tank 1 may be formed from a vertically orientated stainless-steel pipe having an outer diameter y of from 5 to 12.5 cm, or 2 to 5 inches; or from 10 to 11.5 cm, or 4 to 4.5 inches. A tank of this diameter may be used in the nuclear fuel processing industry to prevent potential criticality accidents due to excessive buildup of radioactive material at any given depth in the tank. In various embodiments, the tank may have a height x of 0.5 to 5 meters, 1 to 4.5 meters, 2 to 4 meters, or 3 to 3.8 meters. The tank may have an outer diameter y of 11 to 11.5 cm, and a height x of 3.5 to 3.6 meters, and may be sealed at the top and bottom to create a tank that has a capacity of roughly 30 L. Tank 1 is geometrically safe to prevent possibility of a criticality accident during radioactive salt storage, and the stainless-steel material is chemically resistant to concentrated nitric acid.

The system disclosed herein is suitable for receiving and storing any fissile-bearing solution inside a fuel manufacturing facility. Any soluble salt of uranium, thorium, plutonium, or an oxidized form thereof may be used. The only limitation is material compatibility between the tank 1 and the solution. A solution of a salt of uranium, thorium, or plutonium in an aqueous sulfuric, nitric, or phosphoric acid medium is compatible with stainless steel tank 1. A solution of a salt of uranium, thorium, or plutonium in aqueous HCl would not be compatible with stainless steel, as HCl corrodes stainless steel. Should storage of a salt of uranium, thorium, or plutonium in aqueous HCl be desired, tank 1 may be constructed from a glass pipe.

The upper end of tank 1 is sealed with the backflow-safe inlet flange, which includes cap 2 having a flange. The cap 2 includes a lateral wye fitting 5 with a vertical pipe and a lateral pipe 4. The lateral pipe 4 is configured to direct radioactive salt solution from a solution inlet to the interior of tank 1. The vertical pipe in the lateral wye fitting 5 is configured to vent gases in tank 1 to a ventilation system. Tank 1 may include a demister 17, to enhance the removal of radioactive salt solution droplets from gases vented from tank 1. Demister 17 may be a mesh-type coalescer to cause droplets to coalesce into larger drops. Demister 17 may be a knitted wire mesh pad mist eliminator, a woven mesh mist eliminator, a nonwoven mesh mist eliminator, or a mist eliminator formed from a plate or a series of plates with fine perforations. Demister 17 is positioned in tank 1, immediately under cap 2.

Figure 6:
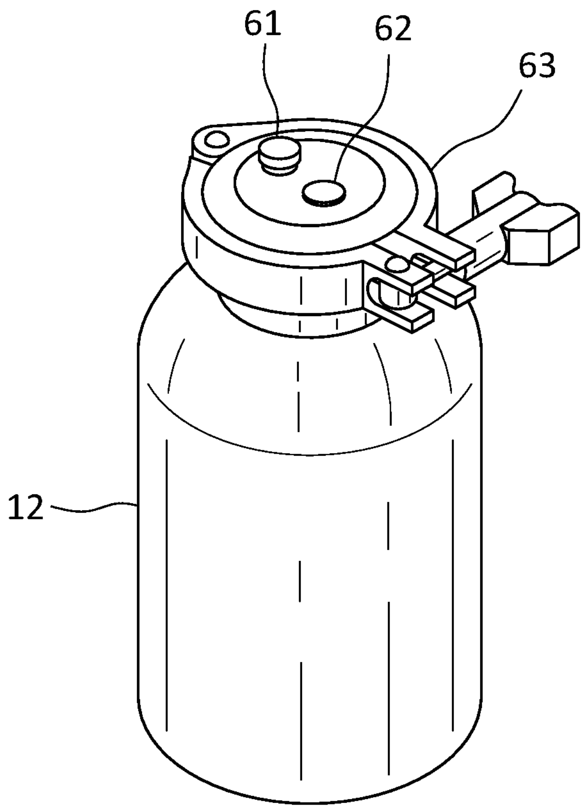
FIG. 6 illustrates an overflow bottle for use in the system of FIG. 1.

To prevent spilling radioactive salt solution in the event that tank 1 overflows during filling, an overflow line 13 carries excess radioactive salt solution from the lateral wye fitting 5 to criticality-safe tank overflow bottle 12, shown in more detail in FIG. 6. The pipes in the lateral wye fitting 5 may have an outer diameter which is greater than the diameter of the opening in the overflow bottle 12. The outer diameter of the overflow line 13 may be the same as the inner diameter of the lateral wye fitting 5 when it exits fitting 5. To compensate for the difference in the initial outer diameter of the overflow line 13 and the diameter of the opening in the overflow bottle, one or more pipe reducer couplings 8 and 9 may be used to reduce the diameter of the overflow line.

Between cap 2 and lateral wye fitting 5, valve 3 may be positioned. When valve 3 is open while filling tank 1, radioactive salt solution may pass from lateral pipe 4 to the interior of tank 1, and gases in tank 1 may be vented through the vertical pipe in fitting 5 to the ventilation system. When valve 3 is closed, radioactive salt solution may be stored in tank 1 without allowing spillage of the solution or venting of gases. Valve 3 may be controlled by control 3*a*.

Tank 1 may include a solution outlet 14 at the bottom of the tank, allowing the contents of tank 1 to be emptied and recovered. Valve 7 may be used to open or close solution outlet 14. A sidestream 15 opened or closed by valve 6 may be used to sample the radioactive salt solution in tank 1.

Overflow line 13 may be fitted with a sight glass 16. The interior of overflow line 13 may be monitored with a camera or optical sensor 10 to detect radioactive salt solution in the overflow line. If radioactive salt solution is detected in the overflow line 13, sensor 10 may send a signal to CPU 11.

In various embodiments, tank 1 is manufactured from a stainless steel pipe with a nominal pipe size (NPS) of 4 to 5, and cap 2 at the top of tank 1 is a flange cap for an NPS 4 pipe or an NPS 5 pipe, as needed. Two ports are machined into the flange cap: a ¾" port for a level switch, and a 2" port for connection to the lateral wye fitting through valve 3. In various embodiments, the inlet assembly includes the following components:

- valve 3, which may be a 2" solenoid valve; and
- lateral wye fitting 5, which may be a 2" lateral wye, modified with a 2" overflow pipe and a lateral pipe 4 with a funnel-shaped opening.

Figure 2:
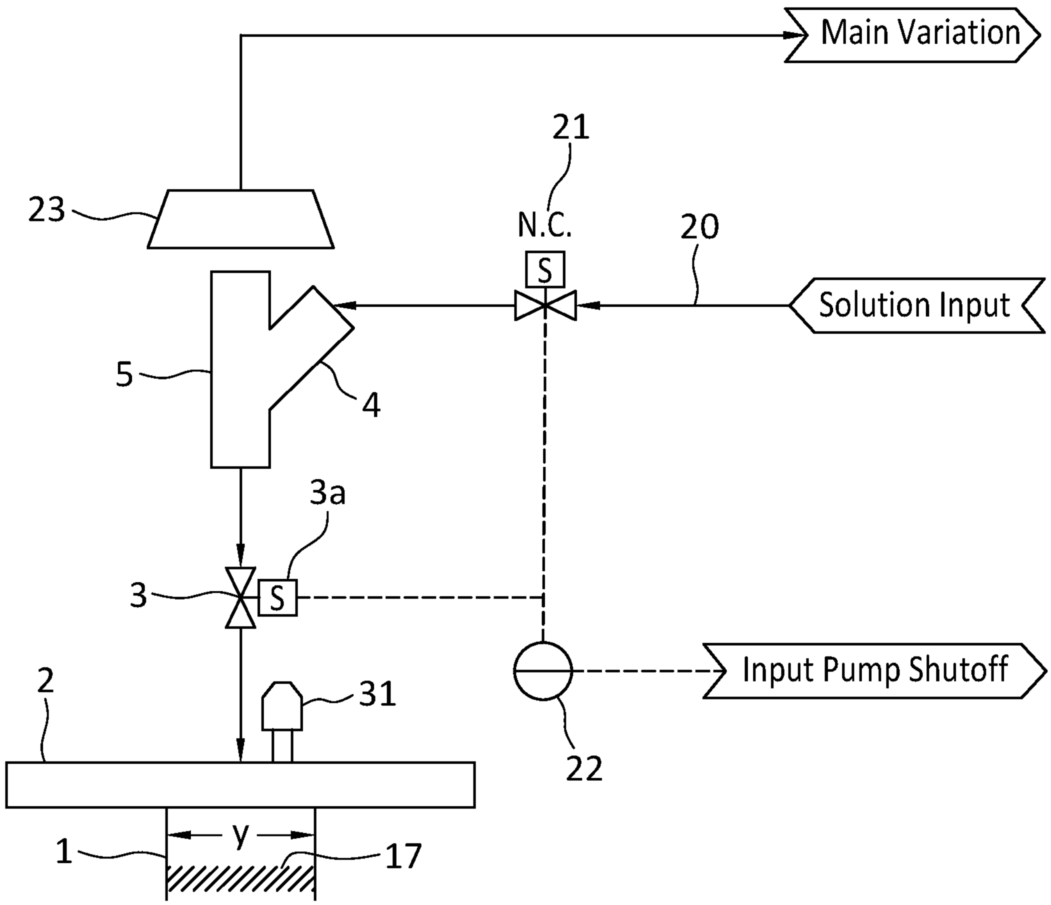
FIG. 2 illustrates a control system for managing fluid flow in the system of FIG. 1.

FIG. 2 shows a control system for managing flow of input solutions and off gases in the system of FIG. 1. Cap 2 on tank 1 includes level switch 31, configured to provide a signal that the tank 1 contains a maximum volume of the radioactive salt solution, i.e., that tank 1 is full. A first valve 21 is configured to terminate flow of the radioactive salt solution from the solution input 20 to the lateral pipe 4 upon receipt of the signal from the level switch. The second valve 3, also shown in FIG. 1, is configured to:

- allow flow of the radioactive salt solution from the tank 1 to the overflow line 13 (not shown in FIG. 2), and
- allow flow of gases from the tank 1 to a ventilation system through ventilation pickup 23.

When level switch 31 detects that tank 1 is full, a signal from level switch 31 is sent to CPU 22, which may be the same as, or different from, CPU 11 in FIG. 1. Upon receipt of the signal from level switch 31, CPU 22 sends a first signal to an input pump pumping radioactive salt solution to the solution input 20, where the first signal turns off the input pump to prevent overfilling tank 1. CPU 22 also sends a second signal to valve 21, closing valve 21 to terminate flow of the radioactive salt solution from the solution input 20 to the lateral pipe 4, also to prevent overfilling tank 1. CPU 22 sends a third signal to valve 3, opening valve 3 to allow flow of the radioactive salt solution from the tank 1 to the overflow line 13 and allow flow of gases from the tank 1 to the ventilation pickup 23.

Valve 21 is set to a Normally Closed condition so that, should valve 21 fail, it will fail in a closed position to prevent overfilling of the tank. Valve 21 is meant to cut off flow from the solution input. While filling the tank, CPU 22 sends a signal to valve 21 to open to allow flow of the radioactive salt solution into the tank 1.

Valve 3 is set to a Normally Open condition so that, should valve 3 fail, it will fail in an open position to prevent spilling of the radioactive salt solution when the tank is being filled. When the tank is not being filled or emptied, valve 3 is closed to seal radioactive salt solution and vapors within tank 1, so as to limit emissions that may be radioactive or dangerous. During normal operation, valves 3 and 21 work together to allow flow only under conditions which prevent backflow.

In various embodiments, valves 3 and 21 are remote-actuated valves. Suitable remote-actuated valves include air actuated pneumatic valves, motor-driven valves, and solenoid valves.

Figure 3A:
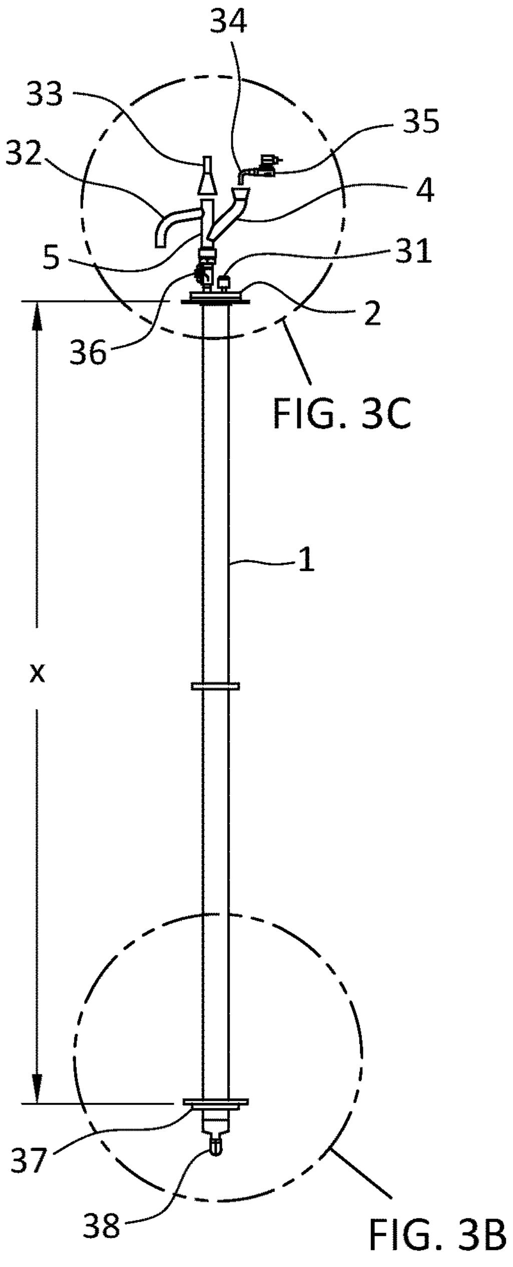
FIGS. 3A to 3C illustrate a system for receiving and storing a radioactive salt solution, including a tank configured to receive the radioactive salt solution; and a cap with a lateral wye fitting.
Figure 3C:
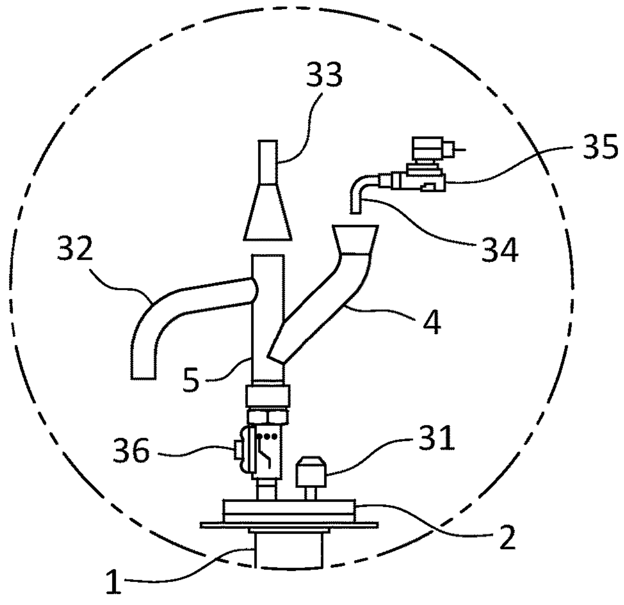
Figure 3B:
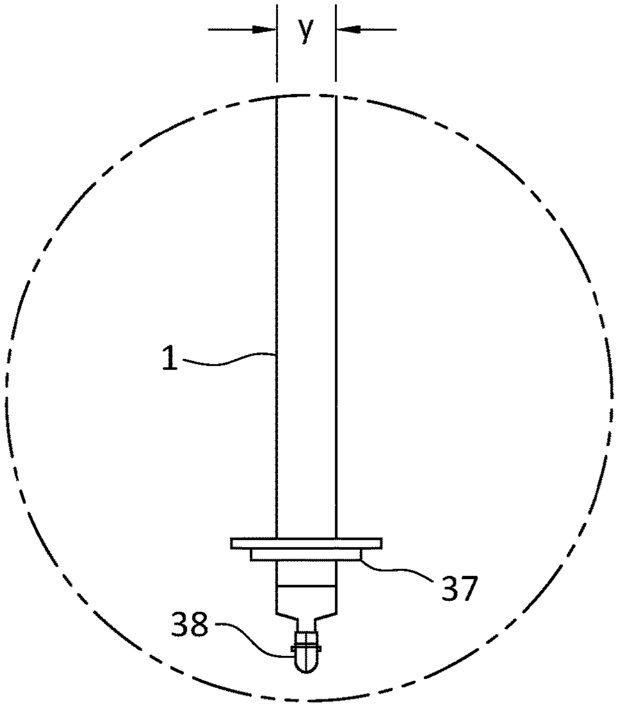

FIGS. 3A to 3C show an embodiment of the disclosed system for receiving and storing a radioactive salt solution. The system includes a tank 1 with an outer diameter y, e.g., 4.5 inches, and a height x, e.g., 141 inches. FIGS. 3A and 3B show the bottom of tank 1, which includes a flange 37 and a radioactive salt solution outlet with a valve 38.

FIGS. 3A and 3C show the top of tank 1, which includes a cap 2. Cap 2 includes a level switch 31, which fits into a first opening in cap 2 for use in the control system of FIG. 2. Lateral wye fitting 5 is connected to a second opening in cap 2, with valve 36 therebetween. When the tank is filled, a radioactive salt solution flows from a solution inlet 34 through valve 35 to the lateral pipe 4 of lateral wye fitting 5. During a filling operation, both valve 35 and valve 36 are open, allowing radioactive salt solution to flow from inlet 34 through the lateral wye fitting and into tank 1 through valve 36. After filling the tank, both valve 35 and valve 36 are closed to prevent spilling the radioactive salt solution.

An overflow pipe 32 extends from the vertical pipe of lateral wye fitting 5. If tank 1 is overfilled during a filling operation, the excess solution may back up into the lateral wye fitting. This solution is drained through overflow pipe 32 to an overflow bottle (shown in FIG. 1). This prevents excess solution from spilling out of the opening in lateral pipe 4, where solution is received from inlet 34, or from the ventilation opening in the vertical pipe of lateral wye fitting 5.

As seen in FIG. 3C, ventilation pickup 33 is shaped like in inverted funnel. Gases within tank 1, which may be radioactive or contain nitric acid vapors, may escape tank 1 through valve 36 during a filling operation, and pass through the vertical pipe of lateral wye fitting 5. Suction may be applied to ventilation pickup 33, so that gases escaping from tank 1 are sucked into ventilation pickup 33.

Lateral wye fitting 5 provides a solution input through the lateral pipe 4, an independent ventilation pathway through the vertical pipe, and an independent overflow pathway through overflow pipe 32. Positioning the wye fitting 5 above valve 36 allows for the sealing of tank 1 without providing the avenue for a blocked ventilation pathway. The ventilation pathway through the vertical pipe of fitting 5 must passively be open during operation. If the ventilation pathway and the solution input were separate ports in cap 2, a valve on the ventilation pathway would allow for the valve to fail in an open position, and thus would not be passively safe. Since the ventilation pickup 33 and the solution inlet 34 are each above valve 36, if valve 36 is closed, the tank is not in operation and gases cannot escape from the tank. Thus, the ventilation pickup and inlet filling are linked by this component.

The system of FIGS. 3A to 3C includes a means for preventing back pressure backflow into the solution inlet 34. Such backflow is caused by a downstream pressure that is greater than the inlet pressure. As seen in FIG. 3C, backflow may be prevented by an air gap between inlet 34 and lateral pipe 4. If desired, an air gap may be replaced with a mechanical backflow preventer to introduce a physical barrier to backflow. The mechanical backflow preventer may be a reduced-pressure principle assembly, a double check valve assembly, or a pressure vacuum breaker assembly.

A second air gap may be introduced between the ventilation pickup 33 and the opening in the vertical pipe of lateral wye fitting 5. This air gap prevents radioactive salt solution in the lateral wye fitting 5 from being sucked into ventilation pickup 33.

Referring to FIGS. 3B and 3C, during a filling operation, valves 35 and 36 are both open to allow incoming solution to enter tank 1 through valves 35 and 36, while allowing ventilation of gases through valve 36. During the filling operation, valve 38 is closed to hold the solution in tank 1. After filling is completed, valves 35 and 36 are both closed to prevent overfilling the tank, or escape of cases or radioactive salt solution from tank 1; and valve 38 is closed. When emptying tank 1, valve 38 is opened to allow the radioactive salt solution to flow out of tank 1, and valve 36 is opened to allow atmospheric gas to enter tank 1 and prevent formation of a vacuum inside the tank.

Figure 4:
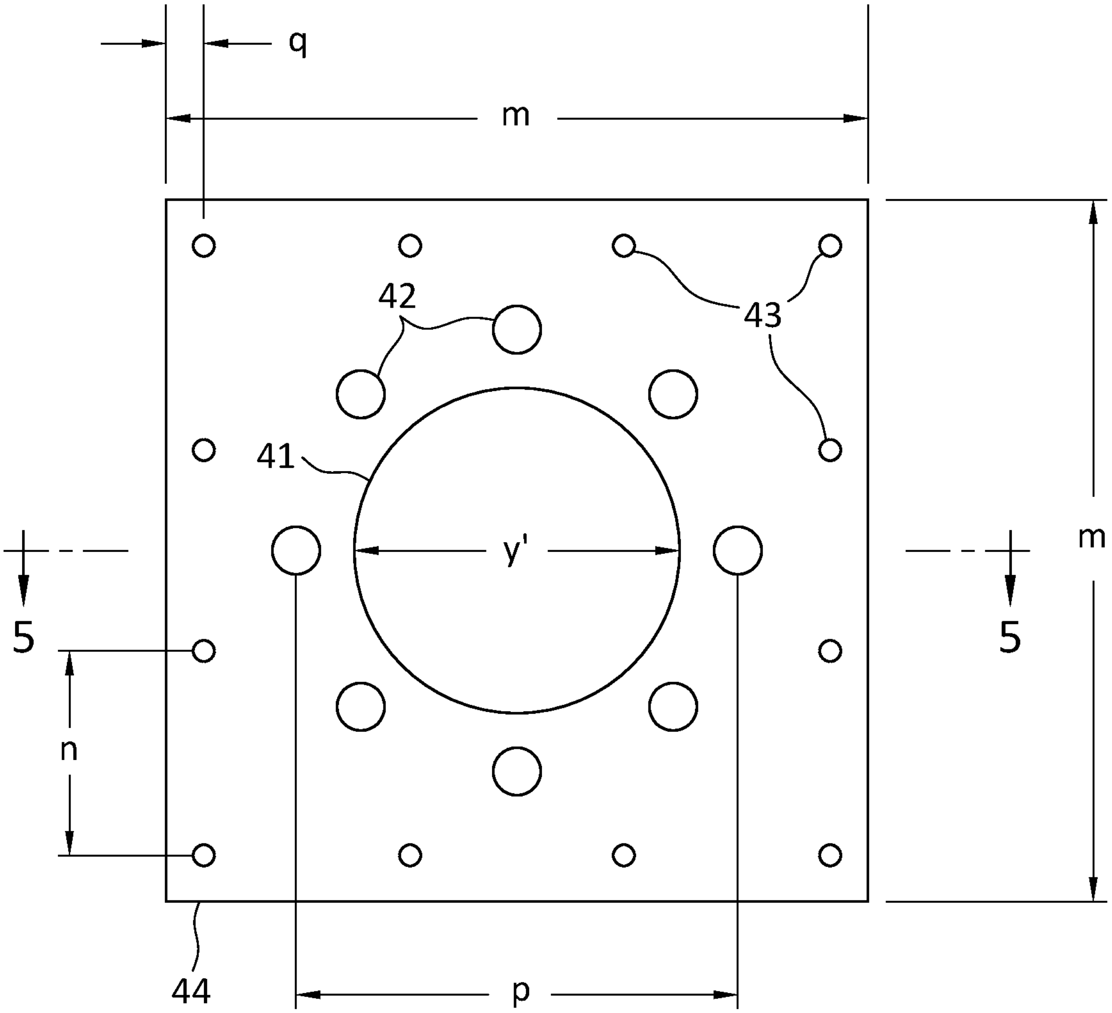
FIG. 4 illustrates a tank support plate.

FIG. 4 shows a criticality-safe tank support including tank support plate 44 with length and width m, used for the system of FIG. 3A. The tank support plate includes a central hole 41 with a diameter y', where y'=y+Δ. Diameter y' is slightly larger than the outer diameter of tank 1 by distance Δ, so as to allow the lower end of tank 1 to slide through the opening of central hole 41 without interference. Holes 42 are configured to receive bolts passing through flange 37 of FIG. 3B, where holes 42 are arranged in a circle concentric with central hole 41. In various embodiments, each hole 42 has a corresponding hole 42 on an opposite side of central hole 41, where each pair of opposing holes 42 is separated by a distance p. Tank support plate 44 also includes holes 43 along the margins of plate 44. Holes 43 are configured to receive bolts through a support skid (shown in FIG. 5). Each pair of adjacent holes 43 is separated by a distance n. Each hole 43 is separated from an edge of plate 44 by a distance q.

Figure 5:
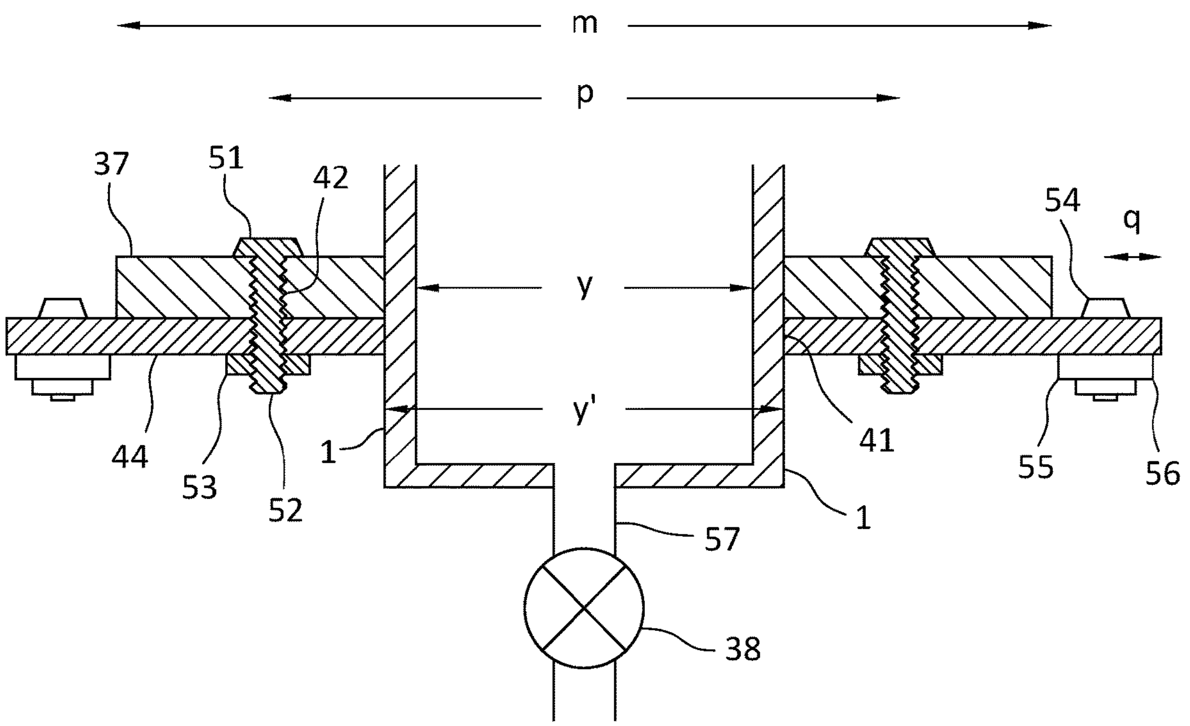
FIG. 5 illustrates a tank mounted to a rack using the tank support plate of FIG. 4.

FIG. 5 shows a tank of FIG. 3B mounted to a tank support plate 44 of FIG. 4, where plate 44 is shown in cross section. Tank 1 has an outer diameter y', and an inner diameter y. Tank 1 passes through central hole 41 of plate 44. Flange 37 on tank 1 is bolted to plate 44 with bolts 52 having heads 51. Bolts 52 pass through holes 42 in plate 44, and are secured in position with nuts 53. Tank support plate 44 is in turn bolted to support skids 56 with bolts 54. Bolts 54 pass through holes 43 (shown in FIG. 4) in plate 44, and are secured in position with nuts 53. This system including tank support plate 44 bolted to flange 37 provides a robust support for the tank. As seen in FIG. 5, tank 1 includes an outlet 57 leading to valve 38.

In various embodiments, an NPS 4 pipe flange or an NPS 5 pipe flange is used as flange 37, and is bolted to plate 44. Flange 37 is also secured to an outer surface of tank 1, in much the same way that cap 2 is fixed to the upper end of tank 1. Plate 44 is secured to the support skids 56. This provides a robust support for tank 1.

FIG. 6 shows an overflow bottle 12 for connection to overflow line 13 of FIG. 1. Bottle 12 is has a volume of 0.5 to 5 liters, 0.7 to 4 liters, 0.75 to 2.25 liters, or 0.8 to 1.2 liters. Bottle 12 has a closure 64 with a first opening configured to receive a breather vent 61, where breather vent 61 vents gases from inside bottle 12. Closure 64 has a second opening 62 adapted to be connected to overflow line 13. In various embodiments, bottle 12 and closure 64 are made of an acid resistant material such as stainless steel. Opening 62 may be butt-welded to overflow line 13. A means 63 is provided for securing bottle 12 to closure 64. In various embodiments, closure 64 may have a skirt with a female thread, and bottle 12 may have an opening with a male thread corresponding to the female thread, so that the bottle 12 may be unscrewed from closure 64. In various embodiments, closure 64 and bottle 12 may be secured together with a tri-clamp closure, or a clamp with C-shape clamping sections connected by a hinge, the clamp being configured to engage an outer circumference of the cap and an outer circumference of the mouth.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A system for receiving and storing a radioactive salt solution, comprising:

a tank having a top and a bottom, the tank being configured to receive the radioactive salt solution while preventing criticality accidents, wherein the tank has a defined width;

a solution inlet for carrying the radioactive salt solution to the tank;

an overflow bottle;

a cap sealing the top end of the tank, the cap comprising a lateral wye fitting having:

a lateral pipe configured to direct the radioactive salt solution from the solution inlet into the tank, a vertical pipe configured to direct gases from the tank to a ventilation system; and an overflow line configured to carry excess radioactive salt solution from the tank to the overflow bottle; and a first air gap between the lateral pipe and the solution inlet configured to prevent backflow of the radioactive salt solution into the solution inlet.

2. The system of claim 1, further comprising a pickup for the ventilation system configured to receive the gases from the tank, and a second air gap between the pickup and the vertical pipe configured to prevent flow of the radioactive salt solution into the pickup.

3. The system of claim 2, further comprising a control system comprising:

a level switch configured to provide a signal that the tank contains a maximum volume of the radioactive salt solution;

a first valve configured to terminate flow of the radioactive salt solution from the solution inlet to the lateral pipe upon receipt of the signal from the level switch; and a second valve configured to:

allow flow of the radioactive salt solution from the tank to the overflow line, and allow flow of the gases from the tank to the pickup.

4. The system of claim 3, wherein:

the first valve is set to a Normally Closed condition to prevent overfilling of the tank in the event of failure;

the second valve is set to a Normally Open condition to prevent spilling of the radioactive salt solution in the event of failure when the tank is being filled; and the second valve is configured to be closed when the tank is not being filled or emptied.

5. The system of claim 3, wherein the first valve and the second valve are solenoid valves.

6. The system of claim 3, further comprising:

an input pump configured to pump the radioactive salt solution to the solution inlet, wherein the input pump stops pumping the radioactive salt solution upon receipt of the signal from the level switch.

7. The system of claim 1, further comprising:

a solution outlet, the solution outlet being at the bottom of the tank; and a valve configured to allow the radioactive salt solution in the tank to flow through the solution outlet when the valve is in an open condition.

8. The system of claim 1, wherein the overflow bottle comprises:

a container having a mouth;

a cap comprising:

a breather vent configured to trap harmful vapors, an opening welded to the overflow line; and a means for removably securing the cap to the mouth of the container.

9. The system of claim 8, wherein the means for removably securing the cap to the mouth of the container comprises:

a clamp with C-shape clamping sections connected by a hinge, the clamp being configured to engage an outer circumference of the cap and an outer circumference of the mouth.

* * * * *